United States Patent [19]

Bartley et al.

[11] 4,201,261

[45] May 6, 1980

[54] VEHICLE TIRE

[75] Inventors: Donald R. Bartley, Cuyahoga Falls; James Sidles, Richfield; Stephen C. Sabo, Barberton, all of Ohio

[73] Assignee: The B. F. Goodrich Company, Akron, Ohio

[21] Appl. No.: 823,304

[22] Filed: Aug. 10, 1977

[51] Int. Cl.² .................................................. B60C 5/12
[52] U.S. Cl. ............................. 152/357 A; 152/354 R; 264/326; 525/155
[58] Field of Search ........... 152/354 R, 357 R, 357 A, 152/330 R, 374, 353 R; 260/897 A; 264/315, 326; 425/28 P

[56] References Cited

U.S. PATENT DOCUMENTS

| 2,645,265 | 7/1953 | O'Neil | 152/357 X |
| 3,195,179 | 7/1965 | Laube | 425/28 P |
| 3,208,500 | 9/1965 | Knipp et al. | 152/357 A |
| 3,852,008 | 12/1974 | Shichman | 425/28 P |
| 3,862,106 | 1/1975 | Fischer | 260/79.5 P |
| 3,901,961 | 8/1975 | Gorter et al. | 264/326 |
| 4,006,767 | 2/1977 | Ford | 152/357 A |
| 4,059,651 | 11/1977 | Smith, Jr. | 260/897 A |

FOREIGN PATENT DOCUMENTS

| 227989 | 3/1959 | Australia | 152/357 A |
| 2301098 | 1/1972 | Fed. Rep. of Germany | 152/357 A |

Primary Examiner—John J. Love
Assistant Examiner—D. W. Underwood
Attorney, Agent, or Firm—Joe A. Powell

[57] ABSTRACT

A vehicular pneumatic tire which, except for bead cores, is composed solely of an elastomeric blend strengthened by molecular orientation. The blend is a monoolefin copolymer rubber with a polyolefin and sufficient curing agents to effect vulcanization when the blend is subjected to heat and pressure. The process for making the tire comprises preforming an annulus of the elastomeric blend with bead cores adjacent the edges, the diameter of the preform being essentially that of the bead diameter of the completed tire and the axial distance between the beads less than the transverse arcuate dimension of the completed tire. The preform is cured and while still hot following curing, is stretched and shaped to final size and the generally toroidal form characteristic of conventional pneumatic tires with resulting biaxial molecular orientation, which orientation is retained in the tire by cooling it below the melting point of the polyolefin before removing the tire from the mold.

6 Claims, 4 Drawing Figures

VEHICLE TIRE

BACKGROUND OF THE INVENTION

The modern pneumatic tire for vehicles is a composite of elastomeric material reinforced with fibrous elements in the form of cords of textile, wire or glass materials. The construction of such a tire requires a plurality of manipulative steps and a number of materials of diverse natures, which necessitate large capital investments for sophisticated equipment and a substantial number of operator-guided manipulations. Hence, in spite of their comparatively low cost, modern pneumatic tires for vehicles can be considered both labor and capital intensive.

Efforts to reduce the cost of tires have generally taken the form of increasing complexity of machinery in an effort to reduce the amount of high cost labor required. While significant improvements have been achieved by these expedients, the modern manufacture of a vehicle tire still reqiures the procurement, preparation and incorporation into the product of a large number of diverse materials with resulting complexity and high cost of the apparatus for utilizing those materials.

Some efforts have been made to form tires without filamentary reinforcements, as for example, by casting or molding tires from polyurethane and similar materials. While such tires do eliminate the need for many of the materials customarily employed in conventional rubber-fabric construction, other difficulties have arisen which have thus far prevented adoption of tires of this nature, except for a few special uses.

SUMMARY OF THE INVENTION

In accordance with this invention, an improved pneumatic tire for vehicles is provided by forming the carcass entirely of a vulcanized elastomeric blend of: (a) a monoolefin copolymer rubber (such as EPM or EPDM rubber); and, (b) a polyolefin; the tire being characterized by the vulcanized blend exhibiting biaxial molecular orientation. Preferably, the blend is a polyethylene propylene diene terpolymer with the polyolefin being a polyethylene polymer present in an amount of 10 to 45 parts by weight for each 100 parts by weight of the terpolymer. The orientation of the molecules is effected by preforming a carcass of the blend into a generally annular configuration, with bead reinforcing hoops adjacent either end, the carcass having a diameter approximately that of the bead diameter, or intermediate that diameter and the tread diameter of the completed tire, and the axial distance between the beads being less than the transverse arcuate dimension of the completed tire. This carcass is vulcanized in its preform configuration, after which the vulcanized preform, while at a temperature above the melting point of the polyolefin, is shaped to the generally toroidal configuration thereby causing stretching of the sidewall and tread portions. The toroidally shaped tire is then cooled below the melting point of the polyolefin before release from the shaping apparatus.

Preferably, the preform is provided with a tread pattern so that the completed tire has an anti-skid running surface. This pattern may be formed in the same material which comprises the sidewalls of the tire or may be formed in a separate tread compound applied to the carcass prior to the vulcanization and shaping operations. Alternatively, the preform may be devoid of antiskid forming elements and the tire, when removed from the shaping mold, may then have a preformed tread band secured thereto in a manner well known in the tire retreading art.

The improved tire and method of making the same of this invention, therefore, eliminates the necessity for many of the usual components required in a vehicle tire, with corresponding reduction in the amount of capital, equipment and labor necessary for manufacture of conventional tires.

The details of the steps performed in practicing the method and the structural features of the improved tire made in accordance with referred embodiments of the invention, will hereinafter be described more specifically in conjunction with the accompanying drawings forming a part of the application.

BRIEF DESCRIPTION AND DRAWINGS

DETAILED DESCRIPTION

The presently preferred embodiment of the invention comprises employing a vulcanizable elastomeric blend, which is capable of molecular orientation upon stretching after vulcanization, with sufficient curing agents therein so that the blend is vulcanized when subjected to heat and pressure.

The blend comprises EPM or EPDM elastomers and a polyolefin. The EPM elastomers are ethylene-higher α-olefin copolymers and the EPDM elastomers additionally contain a polyene and are well known. These elastomers normally contain from about 10 to 90% by weight of ethylene with the remainder being at least one higher α-olefin. When such copolymers contain a polyene, the polyene content is about 0.5 to 20% by weight. The higher α-olefins normally are propylene and butene-1. The polyenes can be conjugated dienes, nonconjugated dienes, trienes, and the like. Preferred EPM copolymers have ethylene contents from about 50 to 75 weight percent with 25 to 50% propylene. Preferred EPDM elastomers contain from about 50 to 75% by weight of ethylene, 25 to 50% by weight propylene and about 1 to 10% by weight of a nonconjugated cyclic diene. The polyolefin of the blend may be polyethylene or polypropylene and comprise from 10 to 55 parts by weight based upon 100 parts by weight of the elastomer. However, it is preferred that the plastic be present in the range of 30 to 35 parts by weight.

Figure 1:
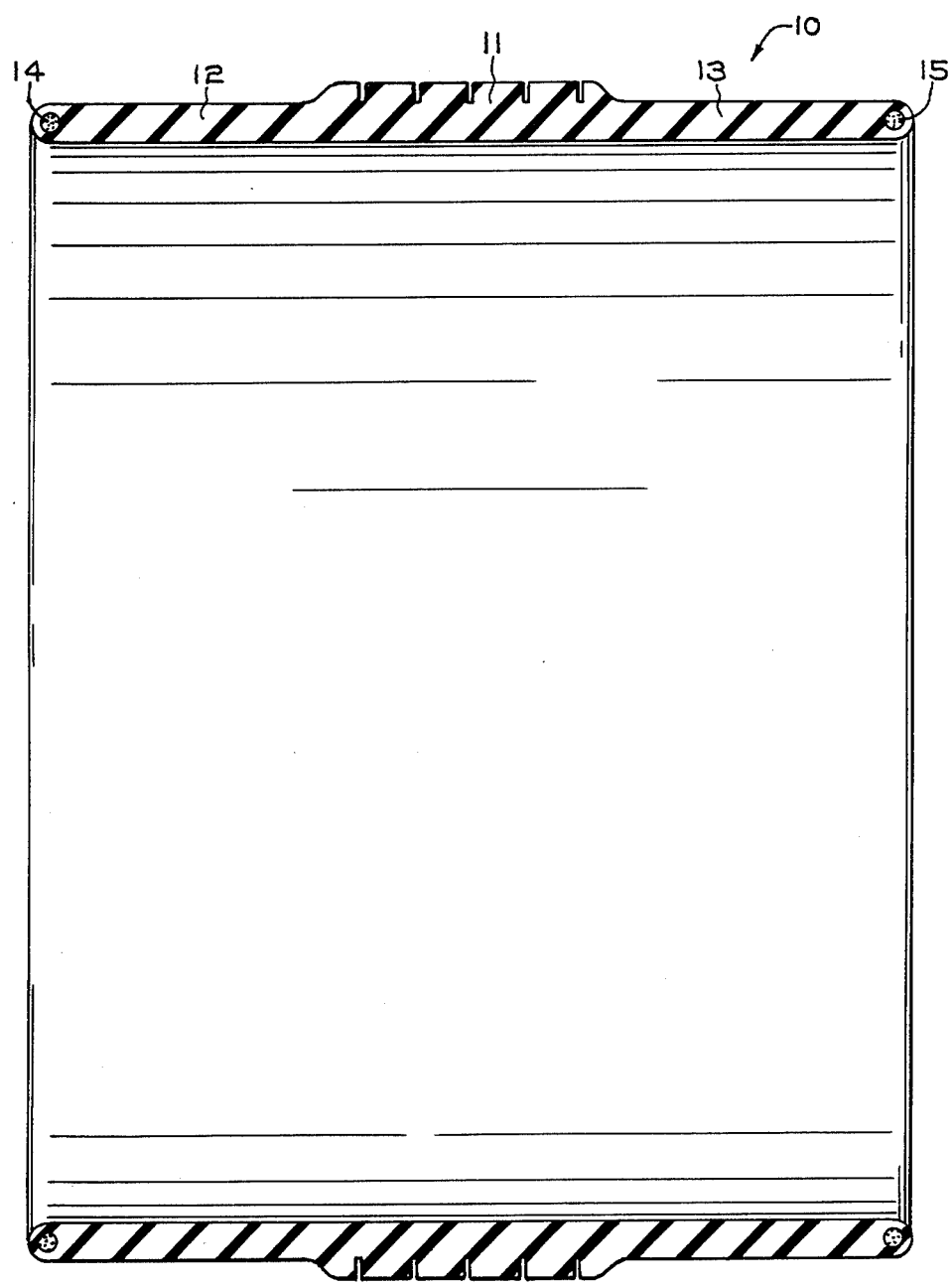
FIG. 1 is a transverse sectional view through a generally cylindrical preform for making a tire in accordance with this invention.
Figure 2:
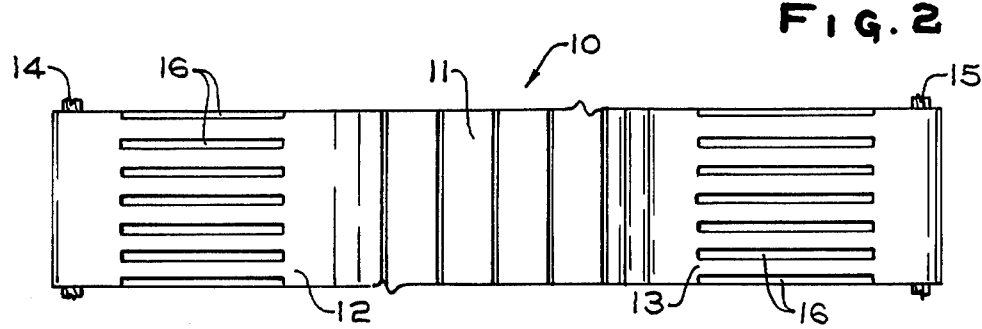
FIG. 2 is a fragmentary plan view of a portion of preform shown in FIG. 1.

The blend is formed into a generally annular preform 10, which, as shown in FIG. 1, is substantially cylindrical. Preferably, the portion 11, intermediate the edges and corresponding to the tread of the completed tire, is of greater thickness than the portions 12 and 13 at either side thereof, which will constitute the sidewalls of the completed tire. Incorporated in the preform 10 adjacent the edges thereof, are wire hoops 14 and 15, which constitute bead cores in the completed tire. These are of conventional construction, preferably of the type known as cable beads, formed of wire disposed in a plurality of convolutions and generally cylindrical in cross-section.

The preform may be made employing a suitable generally annular mold having an appropriate tread anti-skid pattern. The bead cores 14 and 15 are placed in the mold and the blend is then introduced, as for example, by injection or transfer molding, the latter being preferred. The bead diameter of the preform corresponds to that of the completed tire but the transverse width and the circumference of the tread portion 11 are less than the arcuate transverse dimension and tread circumference of the completed tire. The preform is vulcanized within the mold by subjecting it to heat and pressure sufficient to effect cross-linking of the molecules of the elastomer portion of the composition, as is well understood in the art. Preferably, the mold may have inserts which form axially spaced grooves 16 in the sidewalls 12 and 13 and circumferential grooves in the tread portion 11 of the preform for a purpose hereinafter described.

Figure 4:
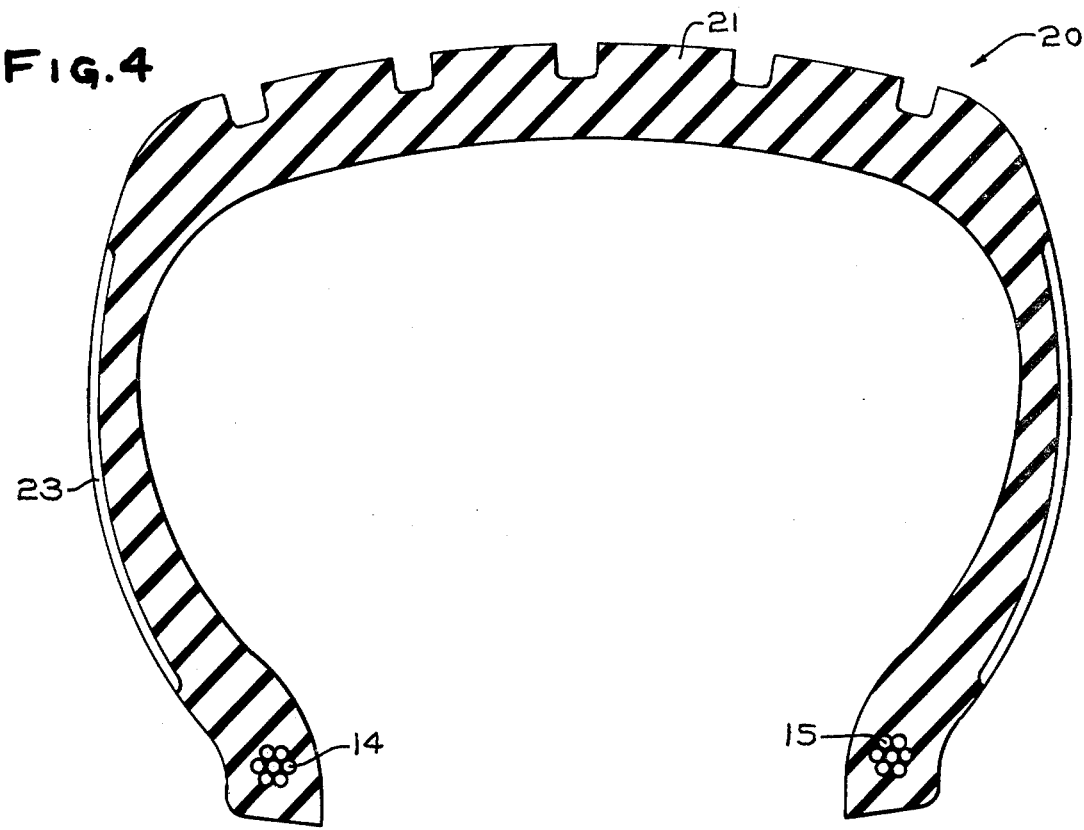
FIG. 4 is a transverse sectional view taken substantially on the section indicating line 4—4 of FIG. 3.

The preform 10 is removed from the curing mold and is then shaped and stretched to the generally toroidal configuration of a conventional vehicle tire. This is effected by introducing the preform into a mold corresponding to the desired final size of the tire. The preform must be sufficiently hot to permit it to stretch to the generally torodial configuration, as shown in FIG. 4, and cause it to conform with the mold surface under the influence of fluid pressure applied to the interior of the preform. Since the preform is already vulcanized, it is not necessary to subject it to a full vulcanizing cycle.

Figure 3:
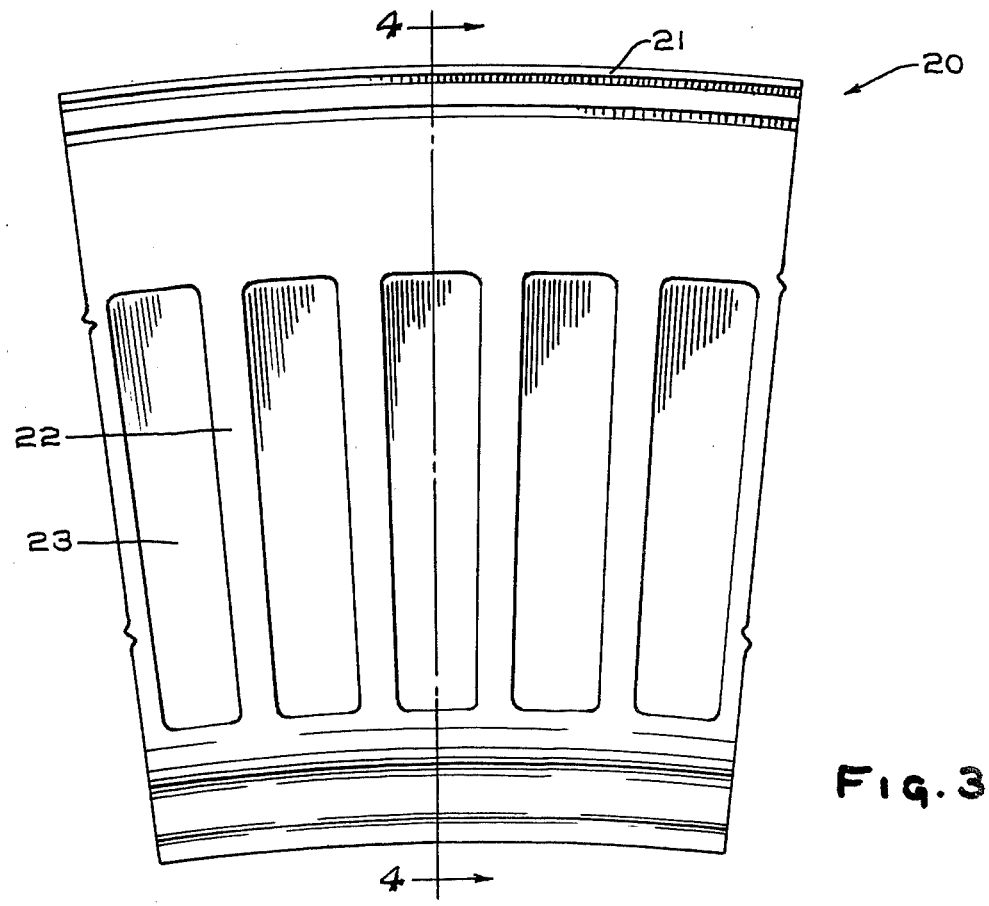
FIG. 3 is a fragmentary side elevational view, to a larger scale than FIGS. 1 and 2, showing a portion of the completed tire

When shaping of the preform has been completed, the tire is cooled to a temperature below that which produces solidification of the plastic portion of the blend, by flushing the interior with cold water prior to removal of the tire from the mold. When removed from the mold, the completed tire 20 will have the appearance of a conventional pneumatic vehicle tire, as indicated in FIGS. 3 and 4, with the running surface provided with an anti-skid pattern 21 in the portion of the tire which corresponds with the region 11 of the preform, as the result of the grooves formed in that portion of the preform, and with the bead cores 14 and 15 occupying their usual positions in the bead regions of the tire.

Examination of the completed tire demonstrates that the elastomer of which it is formed exhibits molecular orientation. This, in general, is biaxial with the orientation of the lower sidewalls being principally in the radial direction. Maximum molecular orientation in the circumferential direction is found in the tread region and is less in the lower sidewalls being substantially nonexistent immediately adjacent the bead cores. The orientation is thought to be due to the stretching of the preform during the shaping operation and is retained by the tire being cooled or set in the stretched condition.

The molecular orientation enhances the tensile strength and stiffness of the blend over that exhibited by the same material which has not been stretched and set in stretched condition after vulcanization. The sidewall strength of the tire if further augmented by the radial ribs 22 produced therein by the material intermediate the grooves 16 provided in the preform, which grooves, as a result of the stretching, have enlarged to form generally oblong-shaped panels 23 in the completed tire 20.

By way of example but not limitation, a 600-13 size inflatable tire is made and vulcanized in the form of a cylinder of 12.5 inches diameter. This vulcanized preform was then heated and stretched to final configuration and cooled in that configuration. This increased the distance from bead to bead measured on the surface of the tire from 7 inches to 14 inches while the tread portion increased from 12.5 inches to 21.76 inches inside diameter.

The running surface of the tire may be formed of a different material than that of the carcass. For example, this surface may be provided by an elastomer of the same nature as that employed in the carcass, but without the addition of the polyolefin, with a band of the tread-forming material placed within the mold for the preform before the remainder of the material for the preform is introduced therein so that both materials are vulcanized together in a single composite unit. Alternatively, the tread material can be applied to the vulcanized preform after it has been removed from the mold in which it is cured and before the composite is placed in the conventional tire mold to effect shaping of the preform in its final configuration. It is also possible to shape the preform 10 to a toroidal configuration without an anti-skid tread pattern for the running surface and then apply to the completed toroid a preformed tread band in a manner well known in the tire retreading art.

The shape of the preform may be that of the zone of a sphere rather than generally cylindrical with the distance from the axis to the tread portion 11 being intermediate that dimension in the completed tire and the radius of the beads. The arcuate distance between the beads of the preform is so chosen as to provide the desired stretching and, hence, orientation of molecules in the completed tire.

As mentioned above, the blend comprises EPM or EPDM elastomer and a polyolefin. The EPM elastomers are ethylene-higher α-olefin copolymers and the EPDM elastomers additionally contain a polyene. These elastomers normally contain from about 10 to 90% by weight of ethylene with the remainder being at least one higher α-olefin. When such copolymers contain a polyene, the ethylene content is from about 10 to about 90% by weight, the higher α-olefin from about 10 to about 80% by weight and the polyene content of about 0.5 to 20% by weight. The higher α-olefins may contain from about 3 to 14 carbon atoms but more normally are propylene and butene-1. The polyenes can be conjugated dienes such as butadiene, nonconjugated dienes, trienes, and the like. Examples of trienes are 1, 4, 9-decatriene. The nonconjugated dienes contain from about 5 to 25 carbon atoms such as 1, 5-hexadiene, cyclic dienes such as cyclopentadiene and dicyclopentadiene, vinyl cyclicenes, indenes, alkenyl norbornenes such as 5- ethylidene-2-norbornene, and the like. Preferred EPM copolymers have ethylene contents from about 50 to 75 weight percent with 25 to 50% propylene. Preferred EPDM elastomers contain from about 50 to 75% by weight of ethylene, 25 to 50% by weight propylene and about 1 to 10% by weight of a nonconjugated cyclic diene. These elastomers have molecular weights from about 20,000 to about 2,000,000 or more. The polyolefin of the blend may be polyethylene or polypropylene.

The blend of rubber and plastic may employ ingredients as set forth in U.S. Pat. No. 3,862,106. However, in accordance with this invention the monoolefin copolymer rubber is mixed with the polyolefin resin and shaped into the preform configuration before vulcanization. Moreover, following vulcanization the material is sufficiently crosslinked that it is not thermoplastic as disclosed for the material when processed as taught in U.S. Pat. No. 3,862,106.

One satisfactory composition for the preform is:

| Ethylene propylene diene terpolymer | 100.0 |
|---|---|
| Polyethylene | 35.0 |
| Carbon Black | 50.0 |
| Zinc Oxide | 5.0 |
| Wax | 3.0 |
| Peroxide | 3.3 |

In this recipe, all quantities are expressed as parts by weight based upon 100 parts of the elastomer. The ethylene propylene diene terpolymer was that sold under the trademark Epcar 587 by The BF Goodrich Company, the polyethylene may be the crosslinkable type sold under the trademark Marlex CL-100 by the Phillips Chemical Company.

Another suitable composition for the preform is:

| Ethylene propylene diene terpolymer | 100.0 |
|---|---|
| Polyethylene | 45.0 |
| Carbon Black | 60.0 |
| Zinc Oxide | 5.0 |
| Curing System | 5.0 |

In this recipe, all quantities are expressed as parts by weight based upon 100 parts of the elastomer. The ethylene propylene diene terpolymer was that sold under the trademark Epcar 847 by The BF Goodrich Company, the polyethylene was that sold under the trademark Marlex Cl-100 by The Phillips Chemical Company and the curing system comprised sulfur or a sulfur donor plus suitable accelerators.

The tread material may be the same as that of the preform. However, in order to provide improved traction, it may comprise a suitable ethylene propylene diene copolymer compound such as either of the two above examples but with the polyethylene omitted. Alternatively, the tread compound may be any of these customarily employed for inflatable vehicle tires with a suitable tie gum or cement interposed between the tread elastomer and preform to effect proper union during vulcanization. Moreover, the invention is not limited to use of the specific compounds given for the preform since modifications can be made therein and in the procedural steps described for constructing the tires by those skilled in the art.

I claim:

1. A vehicle tire of generally toroidal configuration with axially spaced rim mounting bead portions each individually reinforced by at least one annular bead core, the carcass of the tire being formed entirely of a vulcanized elastomer blend of a monoolefin copolymer rubber and a polyolefin, characterized in that the vulcanized elastomer exhibits biaxial molecular orientation.

2. A vehicle tire as defined in claim 1 wherein the elastomer of the said blend is one of EPM or EPDM rubber and the polyolefin is polyethylene.

3. A vehicle tire as defined in claim 1 wherein the sidewalls of the tire are reinforced by integral axially spaced, generally radially extending ribs.

4. A vehicle tire as defined in claim 1 wherein the running surface of the tire is provided with an anti-skid tread integral with and molded from the same material as employed in the carcass.

5. A vehicle tire as defined in claim 1 wherein the running surface comprises an anti-skid tread integral with the carcass, the said tread comprising the same vulcanized elastomer as that in the carcass with no polyolefin blended therein.

6. A vehicle tire as defined in claim 1 wherein the blend comprises an ethylene propylene diene terpolymer and a polyethylene polymer present in an amount of 10 to 55 parts by weight for each 100 parts by weight of the terpolymer.

* * * * *